(12) United States Patent
Schupp et al.

(10) Patent No.: US 12,318,690 B2
(45) Date of Patent: Jun. 3, 2025

(54) SYSTEMS AND METHODS FOR GAME ASSISTANCE AND PRESENTING GAME GUIDES

(71) Applicant: Sony Interactive Entertainment LLC, San Mateo, CA (US)

(72) Inventors: William Schupp, San Diego, CA (US); John Smith, San Diego, CA (US); Caleb Coffey, San Diego, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 169 days.

(21) Appl. No.: 17/885,623

(22) Filed: Aug. 11, 2022

(65) Prior Publication Data

US 2024/0050851 A1    Feb. 15, 2024

(51) Int. Cl.
*A63F 13/00* (2014.01)
*A63F 13/533* (2014.01)
*A63F 13/5375* (2014.01)
*A63F 13/69* (2014.01)

(52) U.S. Cl.
CPC ........ *A63F 13/5375* (2014.09); *A63F 13/533* (2014.09); *A63F 13/69* (2014.09)

(58) Field of Classification Search
CPC ........ A63F 13/533; A63F 13/85; A63F 13/79; A63F 13/26
See application file for complete search history.

(56) References Cited

U.S. PATENT DOCUMENTS

2002/0183105 A1\* 12/2002 Cannon ................... G07F 17/32
463/16
2008/0220869 A1    9/2008 Midgley et al.
(Continued)

OTHER PUBLICATIONS

Dillman et al., "A Visual Interaction Cue Framework from Video Game Environments for Augmented Reality", CHI 2018, Apr. 21-26, 2018.
(Continued)

*Primary Examiner* — David L Lewis
*Assistant Examiner* — Eric M Thomas
(74) *Attorney, Agent, or Firm* — Kilpatrick Townsend & Stockton LLP (57) ABSTRACT

System, process and device configurations are provided for game guides. A method can include detecting user interface selection of a game guide, updating display output and presentation of game guide content. A user interface, processes and device configurations are provided to provide game guidance to assist players of a game find detailed context sensitive game guidance. Game guidance can reduce frustration, increase engagement and keep players in a game. Game guides can present game guide assistance videos that may be presented in addition to game content, such as side-by-side or picture-in-picture to present content to assist a player accomplish tasks of a game and to locate trophies. Game guide elements are provided that include features, such as searching and selection of game guide assistance. Game guide elements can include features for selection of sources and to launch game content. Processes and configurations are also provided for determining game guide content.

20 Claims, 9 Drawing Sheets

(56) References Cited

U.S. PATENT DOCUMENTS

| | | | |
|---|---|---|---|
| 2009/0318224 A1* | 12/2009 | Ealey | A63F 13/533 463/31 |
| 2011/0107220 A1* | 5/2011 | Perlman | H04N 21/2381 715/720 |
| 2012/0309511 A1 | 12/2012 | Chung et al. | |
| 2014/0274353 A1* | 9/2014 | Benson | A63F 13/73 463/29 |
| 2015/0231510 A1* | 8/2015 | Hain | A63F 13/22 463/31 |
| 2017/0354884 A1 | 12/2017 | Benedetto et al. | |
| 2021/0023451 A1 | 1/2021 | Krishnamurthy | |
| 2022/0129120 A1 | 4/2022 | Fujii | |

OTHER PUBLICATIONS

International Search Report dated Oct. 31, 2023 in International Application No. PCT/US2023/072016.

Written Opinon dated Oct. 31, 2023 in International Application No. PCT/US2023/072016.

\* cited by examiner

SYSTEMS AND METHODS FOR GAME ASSISTANCE AND PRESENTING GAME GUIDES

FIELD

The present disclosure is directed to game guides for electronic games, including gaming device user interfaces, gaming device controls, and gaming device communication.

BACKGROUND

Computer and console games often require players to perform tasks in order to advance within a game. Gamers of different skill levels may seek assistance with level completion or advancement through a game. Electronic games and game systems may also rate a player based on task completion. As such, there is a desire for players to complete levels and complete tasks. There is also a desire for players to find hidden items in games.

Existing game systems include features to assist players. However, game assistance is typically to assist with beginning play. Assistance for games is not always available to a player by a gaming system. There is a need and a desire for gaming systems to provide assistance to players. There is also a need and a desire to increase engagement with games and game systems.

BRIEF SUMMARY OF THE EMBODIMENTS

Disclosed and described herein are systems, methods and configurations for presenting a game guide. In one embodiment, a method includes detecting, by a device, at least one user interface selection for a game guide, and updating, by the device, display output to include a game guide element. The method includes identifying, by the device, game guide content for the game guide element, wherein the content includes at least one walkthrough video based on game state. The method also includes presenting, by the device, game guide content with the game guide element.

In one embodiment, at least one interface selection is selection of a game guide action card in a menu display for an electronic game.

In one embodiment, updating the display output includes presentation of the game guide element and presentation of gaming content, wherein each of the game guide element and gaming content are independently controlled.

In one embodiment, updating the display output includes presentation of a listing of game guide assistance videos.

In one embodiment, updating the display output includes display of a plurality of game guide source elements and a search element, wherein the game guide element is presented with a plurality of tab elements, and wherein the tab elements are presented to include a tab for game walkthrough content based on a game state, a tab for user generated content based on a game state, and a tab for user generated content from at least one friend based on a game state.

In one embodiment, identifying the game guide content includes generating, by the device, one or more search terms based on the game state for identification of content.

In one embodiment, presenting game guide content includes presentation of a game guide assistance video with display controls and controlling presentation of a game.

In one embodiment, the device identifies game guide content based on trophy tracking for a game.

In one embodiment, the method includes detecting a user selection of the game guide element and controlling a game state of a game in response to the user selection.

In one embodiment, the method includes detecting the game state, wherein game guide content is identified for the game guide element based on the game state.

Another embodiment is directed to a device configured for presenting a game guide. The device includes an interface and memory storing executable instructions and a controller, coupled to the interface and memory. The controller is configured to detect at least one user interface selection for a game guide and update display output to include a game guide element. The controller is configured to present game guide content with the game guide element, wherein the device identifies game guide content to present in the game guide.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure is directed to providing game assistance. Embodiments are directed to systems, devices and methods for generating a game guide for gaming content. Gaming systems may include consoles that play game media, consoles that provide network data for games, handheld devices, mobile devices (e.g., tablets, mobile phones, etc.) and devices in general configured for electronic gaming. A game guide may include one or more graphical elements providing features to assist users of a gaming system with gameplay of a game. According to embodiments, a gaming system is configured to generate a game guide for display and to determine content for presentation within the game guide. A game guide can include one or more configurations and provide at least one type of content. According to embodiments, a game guide may be displayed as a game guide element including one or more user selectable controls and content to assist a user for a game. Content of a game guide element may include video content, such as user generated content (UGC) of gameplay for a game title. According to embodiments, game guide content may include game walkthrough content related to recent gameplay. Game walkthrough content may be contextual videos and media based on user game play, such as a game state. According to embodiments, a game guide element may identify user generated content from one or more sources, using one or more of the game title, game state and particulars of a game to provide video content that a user can learn about the game from viewing the game guide content. As discussed herein, a game guide element may be generated and presented to include game guide content from one or more sources, such as network servers.

According to embodiments, a game guide element is a user interface element that may be displayed as output of a gaming system during gameplay and/or independently of gameplay. As a user interface element, the game guide element may be operated and interacted with to control operations of a gaming system. By way of example, a game guide element may be displayed for a particular game title to include one or more selectable elements for control and interaction with the game guide element in order to show gameplay of the game title for one or more game states. A game guide element may allow for control of a gaming system including launching and control of game content by a console in response to selections of display elements of the game guide element. A game guide may be displayed as an action card, such as a display element with a defined area that may be presented as part of a menu or as part of an onscreen display. The game guide element may include one or more elements for game assistance, and the arrangement of elements and configurations of the game guide element may be adjusted based on a user selection.

Embodiments are directed to providing a search capability in a game console for game assistance. A game guide element may be configured to include a search box to allow for searching and identification of game assistance content. Operations directed to the game guide element may be based on data collected for one or more game titles of a device user. One or more of a game title, game history and game state may be used to identify content.

Embodiments are directed to providing a user, such as a player, assistance with electronic games. According to content of a game guide element may be directed to assisting a user to complete one or more game tasks. Game guide assistance may also be directed to providing assistance in locating hidden items in game, such as trophies. Embodiments include identifying completion of a game and providing game assistance based on one or more of game completion and trophies located. By using one or more of game and game completion, a solution is provided to providing relative content to a user. In addition, the detailed context sensitive game guidance may be provided to reduce frustration, increase engagement and keep players in the game. Unlike game hints or tutorials produced by game developers, which are often not available for all games, game guide elements allow for identification and searching of assistance and assistance type. In addition, user generated content can be presented in a manner that allows a user to locate content.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1:
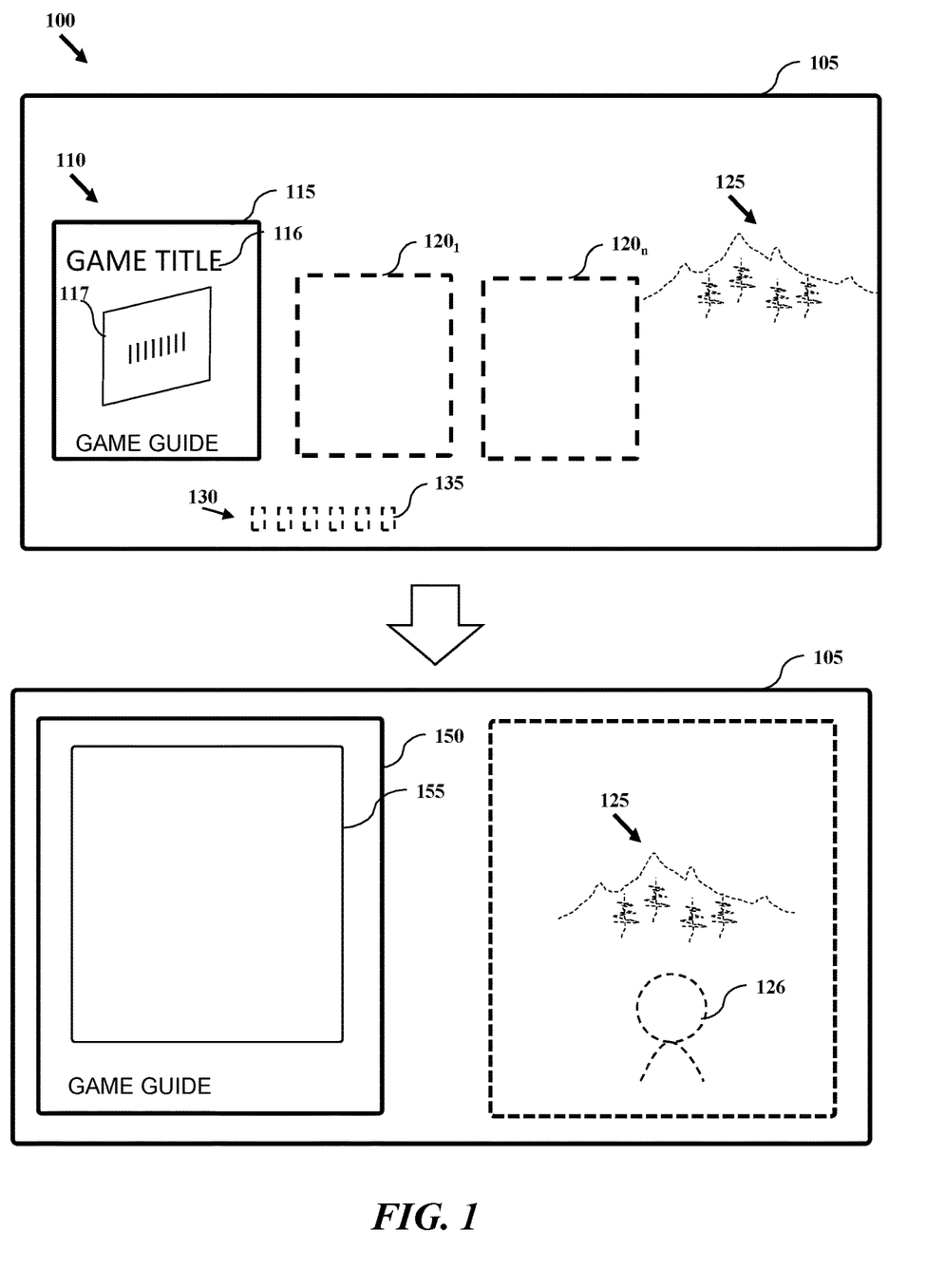
FIG. 1 is a graphical representation of presenting a game guide element and game guide element features according to one or more embodiments.

FIG. 1 is a graphical representation of presenting a game guide element and game guide element features according to one or more embodiments. According to embodiments, a game guide element is a display element of a graphical user interface that provides one or more functions. Presentation of the game guide element may be adjusted based on operations and control requested of a user. FIG. 1 illustrates process 100 for updating the display 105 to include and present game guide elements. According to embodiments, game guide elements may be presented as an action card or menu element of an on-screen display while game content is presented or independent of gameplay presentation.

According to embodiments, process 100 may be performed by a device, such as a gaming console, handheld gaming device, computer, tablet, mobile phone, etc. Process 100 may be initiated by detecting a user selection of a menu. Process 100 will be described as being performed by a device, and in particular a gaming device, and relative to display 105. Display 105 may be part of the device or a device connected to a display. It should be appreciated that principles may be applied to one or more types of gaming configurations. In an exemplary embodiment, a gaming device may detect user selection of a "menu" of "home button" on a controller or input pad. In response to detection of a user input the device (e.g., gaming device) a menu 110 may be output to and/or presented on display 105. Menu 110 may include one or more game guide elements, such as game guide element 115. Menu 110 may also include one or more elements to control the gaming device, such as menu elements $120_{1-n}$. According to embodiments, game guide element 115 and menu elements $120_{1-n}$ may be presented as action cards. In FIG. 1, menu 110, game guide element 115 and menu elements $120_{1-n}$ are shown in a horizontal arrangement. It should be appreciated that game guide element 115 and menu elements $120_{1-n}$ may be positioned in other arrangements, such as a grid, circle, square, layers, etc. Menu 110 may optionally include one or more selectable elements 130 which may be displayed for control of a device. Selection of an element, such as element 135, may updated the presentation of menu 110. Menu 110 and its elements, such as game guide element 115, may be displayed with optional graphical elements 125 of a game. By way of example, when a user selects a menu button during gameplay, the gaming device may display menu and game guide element 115 as an overlay. Accordingly, the top portion of FIG. 1 may relate to a game title menu screen. When not already displaying gameplay content, such as during system start up or after exiting a game, the gaming device may display menu 110 and game guide element 115.

FIG. 1 illustrates presentation of game guide element 115 as an action card initially. Menu 110 may allow for scrolling of one or more action cards in a horizontal, or other, direction, and for selection of the an action card. According to embodiments, an initial display of game guide element 115 may include identification of the game, such as game title 116, and a graphical element 117 associated with the game title, such as cover art, a symbol, etc. Process 100 may include detection of game guide element 115 and updating the presentation of content by the gaming device. In response to user selection of the game guide element, a gaming device may update display of game guide element 115 to a different configuration, such as game guide element 150 having game guide content 155.

According to embodiments, and as shown in FIG. 1, process 100 for presentation of a game guide element may include display of game guide element 150 with optional display of graphical elements 125 of a game. According to embodiments, graphical elements 125 of a game may relate to a gameplay screen and include one or more elements such as controllable character 126. In that fashion, game guide element 150 may be presented with game content. Accordingly, a device may be configured to present game guide element 150 and graphical elements 125 of a game on display 105. Game guide element 150 may be presented on display 105 in one or more configurations, such as an overlay, picture-in-picture and pinned to region of a display. When presenting game guide element 150, a device may update display output and one or more characteristics of a gameplay area to allow for presentation of the game guide element. In embodiments. Presentation of a game guide element 150 can include presentation of video content on an entire display screen. For example, game guide content 155 for a video talk-through may be presented on the full display, without presentation of a user's current game state.

According to embodiments, game guide element 150 may present guide content 155 to assist a user with gameplay. According to embodiments, game guide content 155 may include video content, such as a game talk-through or recorded gameplay, to illustrate how to perform game tasks, such as completion of a level and/or locating a hidden object. Game guide content 155 may also be configured to output non-gaming content, such as video content, visual content, audio content in general. Game guide content 155 may be presented to include controls and/or selectable elements for controlling presentation of game guide content. FIGS. 4A-4B, 5A-5B, 6A-6C and 7A-7B provide examples of game guide elements, game guide content, updating display and presentation of a game guide element and control of a device using a game guide element.

Figure 2:
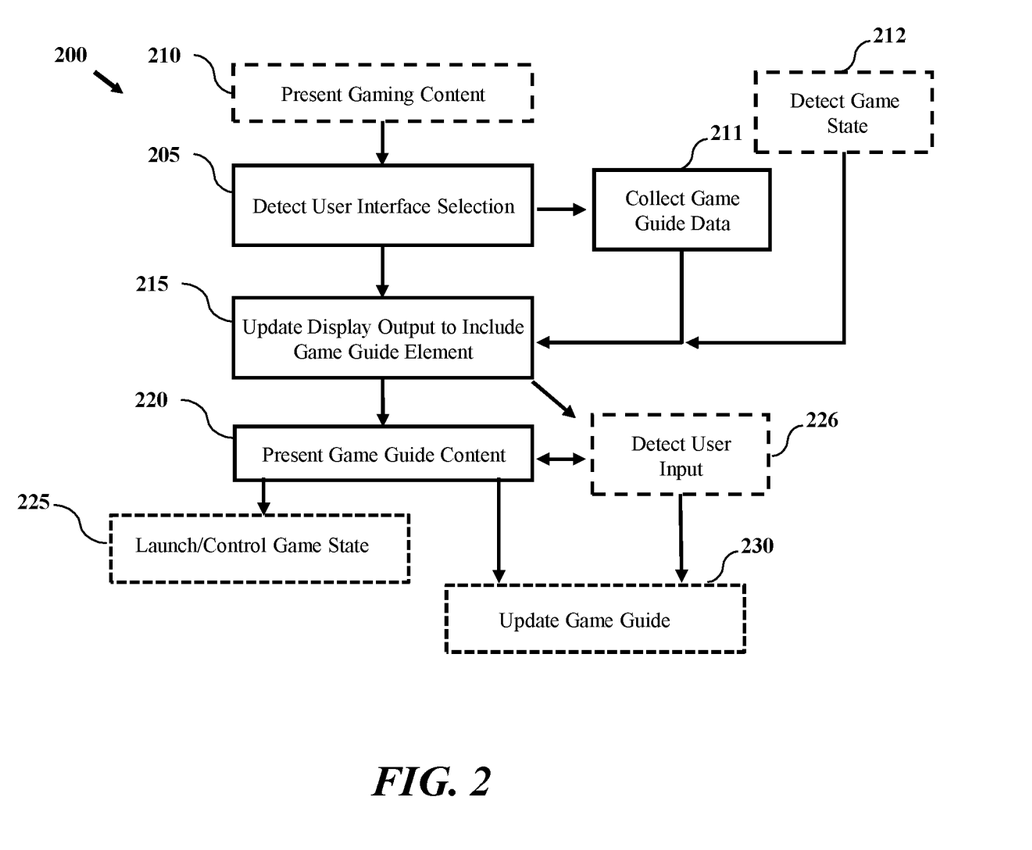
FIG. 2 illustrates a process for presenting game guide content according to one or more embodiments.

FIG. 2 illustrates a process for presenting game guide content according to one or more embodiments. Process 200 may provide detailed context sensitive game guidance. Process 200 may be performed by a device, such as device 305 and/or controller 325 of FIG. 3, to generate game guide elements and present guidance for a game. Process 200 may be initiated by a device (e.g., device 305) detecting at least one user interface selection at block 205. According to embodiments, user interface selection may be selection of one or more graphical elements or menus of a gaming system.

According to embodiments, a user interface selection may be detected during display of a menu of a gaming system or a game. According to embodiments, game guide elements may be presented as part of a user interface of a gaming device, and may be displayed when a game is not actively being presented or when a game is presented by the device.

Process 200 may optionally include presenting gaming content at optional block 210. During non-gameplay, a gaming device may present a user interface including one or more display elements such as a game guide element (e.g., game guide element 115) as part of a menu or control screen. Similarly, during gameplay and/or in response to detection of a user input for a menu, such as a user pressed home button and device may display one or more graphical elements that can be navigated to, such as game guide element (e.g., game guide element 115). A gaming device may provide a menu that may display one or more elements, the game guide element may not be the first displayed element. As such a user can navigate to a game guide element. Detection of a user interface selection at block 205 may include detecting deletion of a game guide element.

Game guide elements may be presented as action cards that are display elements that may be selected and used to control a device. At block 205, selection of a game guide action card in a menu display for an electronic game is detected. According to embodiments, display of a game guide element may be presented based on a game state for a game title. According to embodiments a gaming device may track user progress, such as the game state, for a game title, including identifying the last played position in a game, the percentage of completion, number of hidden elements (e.g., trophies, achievements, badge, advancement, award, stamp, medal, challenge, etc.) collected. Process 200 may optionally collect game guide data at block 211 and may optionally detect game state at block 212. Based on the game state a gaming device may determine content that may be relevant for a user. For example, if a player is new to a game, game guide element content may be directed to tutorials or talk-through on how to play a game. Similarly, for a player that has completed at least some of a game, game guide content may include content based on the current level or playing positions of a character and one or more additional attributes of a user for the game. For a player location in a certain world or level, game guide content may be determined directed to that level. Game guide content may be determined based on one or more trophies not collected by a user. When presenting a game guide element, a gaming device may use game start and user characteristics to select game guide elements to present, such as a specific game guide element to advance a level, or locate a hidden object.

At block 211, one or more operations may be performed by a gaming device to identify game guide data to populate a game guide element content. According to embodiments, game guide content may include video data and media illustrating how to complete a task, such as recorded gameplay, or a game walk through, for a game. Collecting game guide data at block 211 may include searching for one or more videos based on a level and game data. One or more of a game state, game map, and gameplay vector may be used to track and collect data based on player progress. Game state may provide level or place in game, and/or a location or a level of game. Guide data may then be searched for by the gaming device based on game state. According to embodiments, a gaming system may utilize one or more of an application programming interface (API) to interface with video sharing services to obtain video content. A gaming device may use a keyword search operation based on game title, game level and a trophy to search and/or identify contextual game guide content. Collecting game data at block 211 may include a device identifying and/or generating search terms based on the game state for identification of content. By way of example, based on a player playing a particular game title, a device may be configured to monitor game state and generate a search string to include one or more of a game title, game state (e.g., level, character, location in a game, and game task hidden object, trophy, etc.) and key words for identification of video content. The device may use identified keywords and search terms to interface with one or more media services, such as a streaming platform or network site to identify game content. By way of further example, a device at block 211 may generated a search string based on game state and receive data for one or more videos and/or media from a network site. Similarly, search strings may be generated by the device to identify user generated content by way of a gaming platform or network. According to embodiments, search strings may be used by a device to identify user generated content of one or more friends.

At block 215, process 200 may include updating display output to include game guide element. According to embodiments, selection of a game guide element may be detected by a gaming device and initiate the gaming device to update a display output to include one or more features of the game guide element. Updating display of a game guide element at block 215 may be one or more of an initial view, intermediary view and configuration. A gaming device console may query the current gameplay information and read game state (e.g., gameplay live) to select game guide content. According to embodiments, updating display output includes presentation of the game guide element and presentation of gaming content. The game guide element may be displayed as an action card with one or more elements and may include content to be selected. During presentation and display of a game guide element and game guide content, the game guide element and gaming content are independently controlled. Updating the display output for game guide content can include presentation of a listing of game guide assistance videos. By way of example, a gaming device may identify at least one video for performing a task, completing tasks to earn a trophy and/or locating a hidden object and provide a graphical element and/or text to describe the video content. According to embodiments, updating the display output includes display of a plurality of game guide source elements and a search element. The game guide element may include separate tabs or elements that may be selected to parse or select different forms of game guide content, such as a search tab, a user generated content tab (UGC) and friends tab. The search tab may be selected by a user to input search terms to identify available content. The UGC tab may be selected to identify UGC content that is available for viewing. UGC content may be identified based on game state. Friends content may be based on content shared by friends of a user. Friend content may be identified based on a network of contents within a gaming system, and/or based on connections identified by a gaming device/console. Friend UGC, may be differentiated from other UGC in that a device may recognize one or more players identified or recognized by a user within a gaming network or gaming platform.

At block 220, process 200 may include presenting game guide content. A user may select game guide content from the game guide element and a gaming device may present the content. According to embodiments, game guide content may be a game assistance video. As such, the gaming device may display in a pinned view or picture in picture view the video on a display. The content may be displayed independently at block 220 or with gaming content. When displaying with gaming content, a user may follow along with the assistance video to learn how to complete a task. Presentation of game guide content can include presentation of a game guide assistance video with display controls and controlling presentation of a game. By way of example controls for play, stop, fast forward and rewind may be accessed by a user. According to embodiments, playback controls may be voice activated so that a game controller can be used to control gameplay. According to embodiments, one or more inputs of a game controller may be used to control playback controls of game guide content.

Process 200 may optionally include launching a game state at block 225. Presentation of game guide content may be display of video content for a game. A gaming device may detect user selection associated with the video content and launch the player to the state of a game associated with the video. For example, a user may view an assistance video on how to defeat a character at a certain level of a game, and selection of the game guide video or a display element may launch the game to be presented and allow gameplay as display output for a user.

Process 200 may optionally include detecting user input to game guide element at block 226. User input may include navigating a video listing, detecting a selection of a video, selection of a game guide tab and entering of search terminology. A gaming device may detect user selection input at block 226 which may be provided for presenting game guide content at block 220. According to embodiments, scrolling through a game guide listing and/or selection of a game guide tab may result in process 200 updating the game guide at optional block 230. A user selection of the game guide element may be detected at block 226 and a game state may be controlled in response to the user selection. A game guide element may have one or more display configurations, including selecting content, for playback of content, and playback controls. Updating a game guide at block 230 may include updating the display format of the game guide element.

Figure 3:
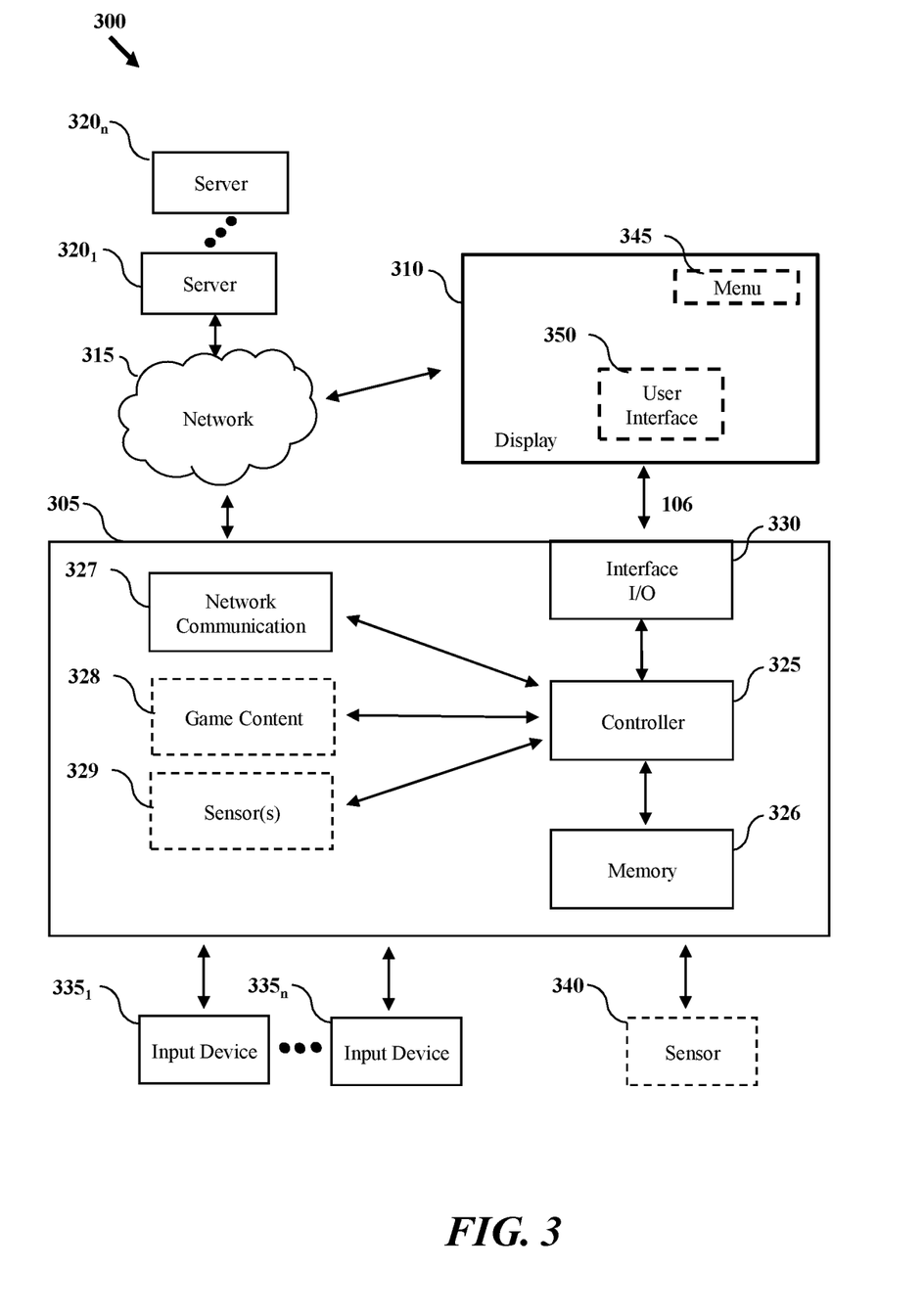
FIG. 3 illustrates a graphical representation of a system and device for presenting game guide elements according to one or more embodiments.

FIG. 3 illustrates a graphical representation of a system and device for presenting game guide elements according to one or more embodiments. According to embodiments, game guide elements may be provided by a device and/or a system. A system can include one or more components and devices. FIG. 3 illustrates system 300 according to embodiments which can include device 305. Device 305 may be one or more of a gaming console, computing device and electronic device in general configured to output gaming content 306 to a display and may include output of game guide elements and game guide content. With respect to gaming content, device 305 may be configured to output data for presentation by a display, or visual output device in general, including graphics (2D and 3D), sound and data. Device 305 may also be configured to output non-gaming content, such as video content, visual content, audio content, etc. Embodiments describe generating dynamic gaming music for electronic games and gaming, however it should be appreciated that the principles of the disclosure may be applied to other forms of media and non-gaming content. As such, device 305 and system 100 may be used to generate customized music for one or more applications.

According to embodiments, device 305 is configured to output data 106 and/or content to display 310. According to embodiments, display 310 may be separate from or part of device 305. Device 305 may be configured for network communication by way of network 315 with one or more servers $320_{1-n}$. Device 305 may be configured to receive one or more of user data, game data and video data (e.g., assistance videos, UGC) from servers $320_{1-n}$. Servers $320_{1-n}$ may be configured to store one or more of user data, game data and game guide data.

FIG. 3 depicts a device configuration according to embodiments. Device 305 may relate to a console, media device, and/or handheld device. Device 305 may be configured to present game guide elements. According to embodiments, device 305 includes controller 325, and memory 326. Device 305 may also include network communication module 327 Device 305 may also optionally include game content 328 and one or more sensors 329.

Controller 325 may relate to a processor or control device configured to execute one or more operations stored in memory 326, such as processes for generation of gaming music. Controller 305 may be coupled to memory 326, network communication module 327, and music generation module 328. Memory 326 may be non-transitory memory configured to provide data storage and working memory operations for device 305. Memory 326 may be configured to store computer readable instructions for execution by controller 325 for one or more processes described herein. Network communication module 327 may be a communications module configured to receive and transmit network communication data. According to one embodiment, controller 325 may be configured to present and update game guide elements.

Device 305 may be configured to receive gaming media (e.g., card, cartridge, disk, etc.) and output visual and audio content of the gaming media to display 310. Device 305 may be configured to receive data from one or more of servers $320_{1-n}$ to present and output game content 328, which may be stored in memory 326. For network games, device 305 may receive game data from a network source, such as servers $320_{1-n}$, and may be configured to generate gaming music for the game data.

According to embodiments, device 305 may include one or more optional sensors 329. Optional sensors 329 may include one or more of audio (e.g., sound), optical (e.g., camera) and spatial (e.g., presence, proximity, etc.) sensors for one or more of collecting user feedback, and for voice control or control of game guide elements.

Device 305 may be configured to receive input from one or more peripheral devices, such as input devices $335_{1-n}$. Input devices $335_{1-n}$ may be controllers or input devices in general configured to provide controls for device 305 and game control. Device 305 may be configured to operate with one or more external sensors, such as optional sensor 340. Optional sensor 340 may be configured to detect audio in the location of a user, and/or presence of viewers.

System 300 may include display 310 for output of visual and audio of an electronic game and/or output of device 305. According to embodiments, display 310 may display control elements of device 305, such as optional menu 350, which may be used to interface with device 305. Display 310 may output user interface 350 received from device 305. Device 300 may utilize one or more operations of processes described herein. It should also be appreciated that system 300 and its components may be configured to perform operations of device 305.

Figure 4A:
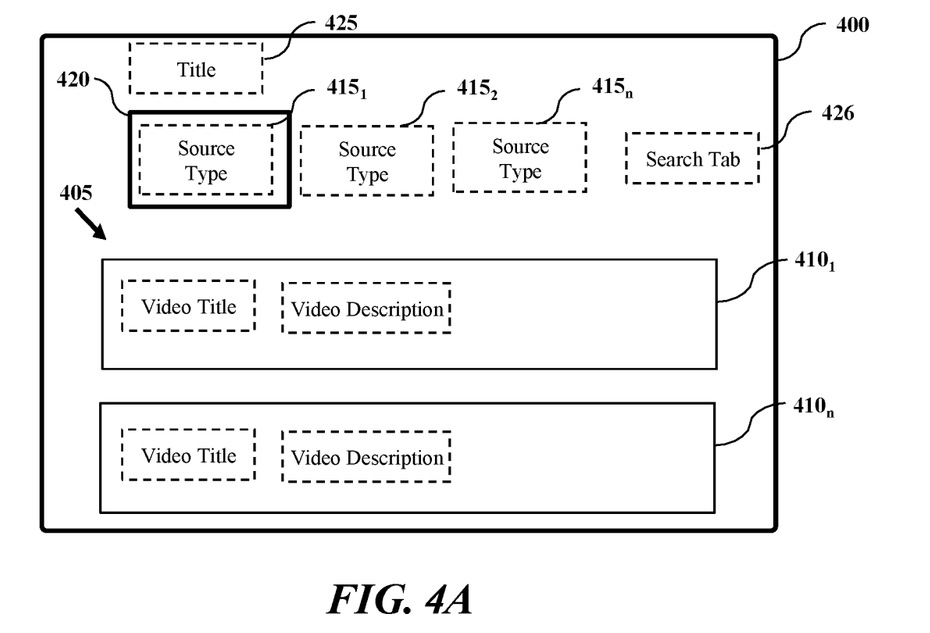
FIGS. 4A-4B illustrate graphical representations of game guide action cards according to one or more embodiments.
Figure 4B:
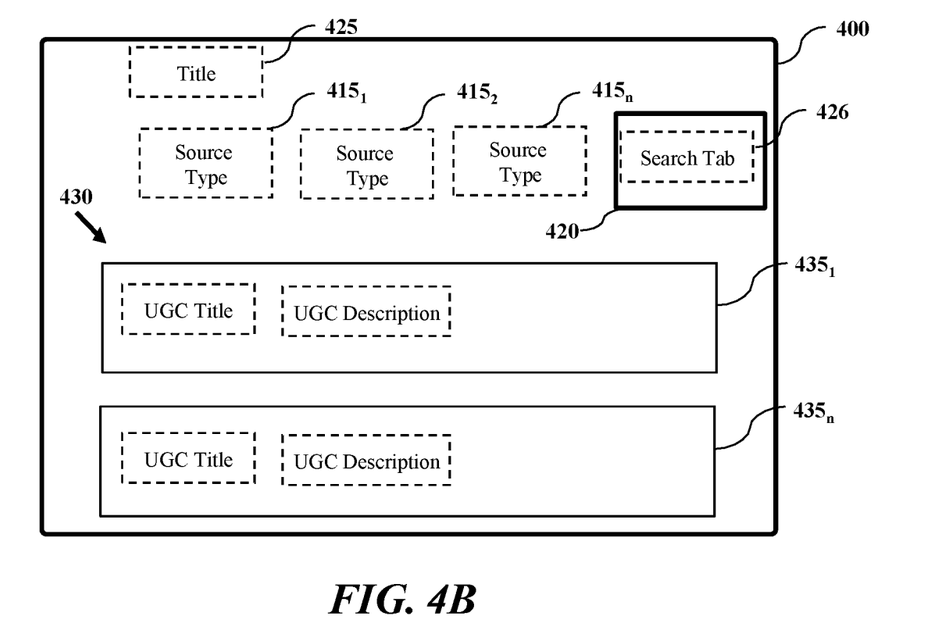

FIGS. 4A-4B illustrate graphical representations of game guide action cards according to one or more embodiments. FIG. 4A illustrates an exemplary representation of a game guide element 400. Game guide element 400 can be displayed to include content 405 which may be selected by a user. Content 405 may be presented as a listing, scrollable listing, icons and adjustable icons. Content 405 may include one or more content items $410_{1-n}$. Content 405 may be graphical elements including one or more of a title and description. Selection of content 405 may adjust the configuration of game guide element 400. According to embodiments, content 405 may be videos or talk-through content to include video content, audio content, voice overs, images, etc. that may be presented by a gaming device to a user. Content 405 may be prepopulated by a gaming device to provide a listing of content, such as videos, when a user selects a game guide element. According to embodiments, game guide element 400 includes a highlight element which may be moved by a user to update the content of the game guide element. A device may be configured to detect and monitor game play including performing one or more processes to identify content 405 for game guide element 400 based on gameplay. FIG. 4A illustrates highlight 420 on source type $415_1$.

According to embodiments, game guide elements may include one or more tabs, such as source tabs $415_{1-n}$ which may be selected to modify the listing of content 405. Game guide element 400 may also include search tab 426 which may be used by a gaming device to obtain search strings to obtain content. According to embodiments, game guide element 400 may displayed to include a graphical area to include search tab 426. Search tab 426 may be displayed with pre-filled content, such as a context aware search string based on gameplay. Pre-filled content may be altered by a user to update search content. A device may be configured to detect user entries to search tab 426 and identify content 405 based on elements of a search string. Game guide element 400 may be displayed with a title 425 to provide an identification of the game guide element and its functions. FIG. 4A illustrates highlight 420 on source type $415_1$. According to embodiments, gaming device may allow for control of the highlight 426 to select a source type in order to populate content 405. According to other embodiments, highlight 420 may be moved to one or more individual content items $410_{1-n}$. According to embodiments, source tabs $415_{1-n}$ of game guide element 400 may include a tab for game walkthrough content based on a game state, a tab for user generated content based on a game state, and a tab for user generated content from at least one friend based on a game state. According to embodiments, a device presenting the game guide element 400 may recommend video content based on the user gameplay. The device may collect one or more of telemetry data for gameplay and video playback to identify relevant videos. Identification of friend content may similarly filter video based on content generated by a friend on a gaming network. In embodiments, friend content can include content viewed by one or more friends relevant to gameplay, wherein friends are based on accounts linked to and/or identified as having a connection with the user. According to embodiments, metadata tagging may be used for identification of videos to present by game guide element 400, such that a device may generate search requests based on metadata collected for one or more of a game state, game play and source.

FIG. 4B illustrates an exemplary representation of a game guide element 400 with highlight moved to a different element search tab 426. According to embodiments, based on user interaction with game guide element 400, the gaming device may update the presentation. By way of example, section of search tab 426, and in accordance with a detected search input, a gaming device may generate a graphical representation of content 430 including a plurality of video titles $435_{1-n}$. Video titles $435_{1-n}$ may be displayed based on the search keywords and based on content received from content sources. Video titles $435_{1-n}$ may relate to user generated content. Based on selection of content of game guide element 400 a gaming device may output the content for display.

According to embodiments. Game guide element 400 may be launched based on a selection of a user interface. It should be appreciated that the arrangement of elements within game guide element 400 may be arranged without departing from the scope of the disclosure.

Figure 5A:
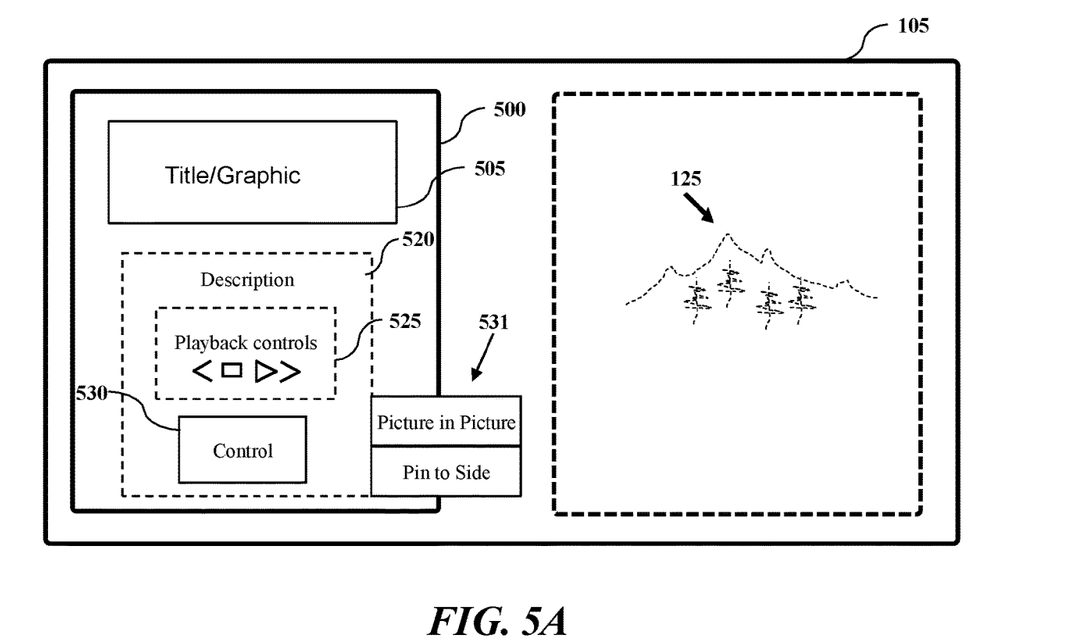
FIGS. 5A-5B illustrate graphical representations of game guide launch according to one or more embodiments.
Figure 5B:
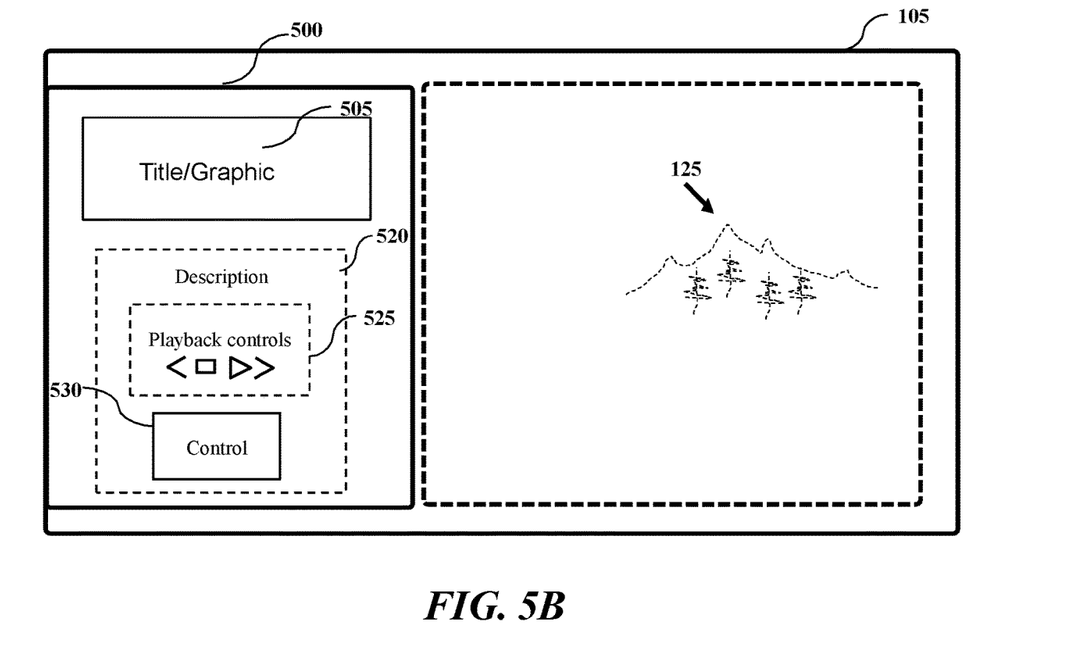

FIGS. 5A-5B illustrate graphical representations of game guide launch according to one or more embodiments. According to embodiments, a game guide element may be presented on a display during or separately from gameplay. FIG. 5A illustrates an exemplary representation of a game guide element at launch, such as following selection of the game guide element from a menu. Game guide element 500 may be displayed with graphical elements of a game, such as graphical elements 125 of a game on display 105.

FIG. 5A illustrates an exemplary representation of display 105 including game guide element 500. Game guide element 500 can be displayed to include a title/graphical elements 505 and controls 520. According to embodiments, title/graphical elements 505 may be a display area for presenting a title of the video and/or video content, such as UGC, recorded gameplay, instructional video, walkthrough media, and play-through media. Controls 520 may include a description of the content, playback controls 525 to play, stop, advance and rewind the video and a control element 530. Control element 530 may be selected to perform one or more operations of a game guide element, such as launching play of the game to a game state. According to embodiments, game guide element 500 can display elements 531 to allow for selection and arrangement of the game guide element on the display including a picture-in-picture arrangement or pinning the game guide element to a side of a display. In response to a user selection, FIG. 5B illustrates an arrangement of game guide element 500 in rearranged position and includes display of game content. Playback controls 525 may be activated based on voice commands and/or inputs to a controller.

Figure 6A:
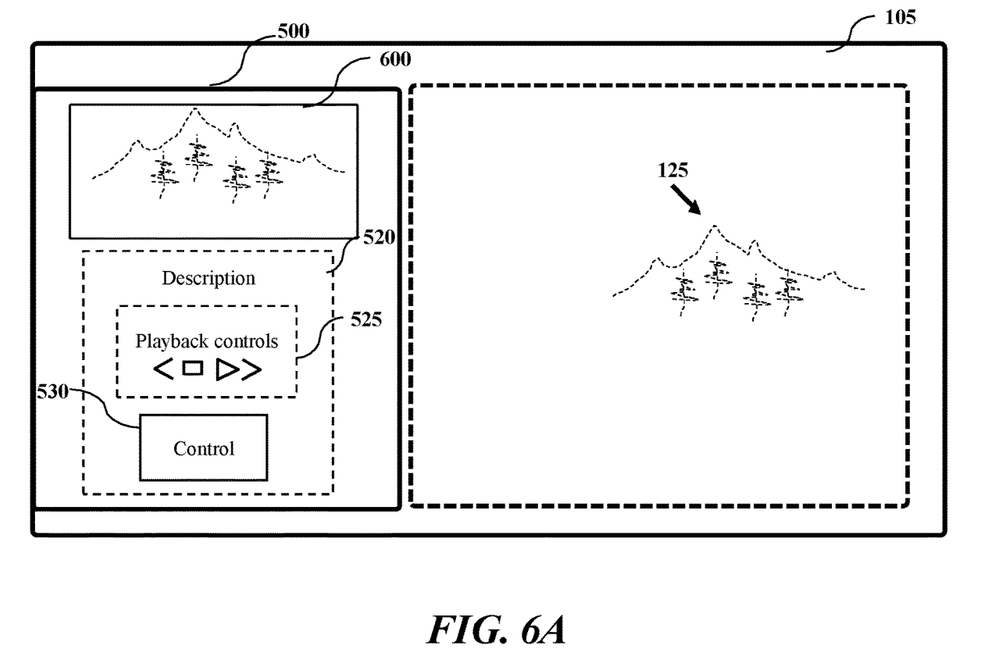
FIGS. 6A-6C illustrate graphical representations of game guide assistance according to one or more embodiments.
Figure 6B:
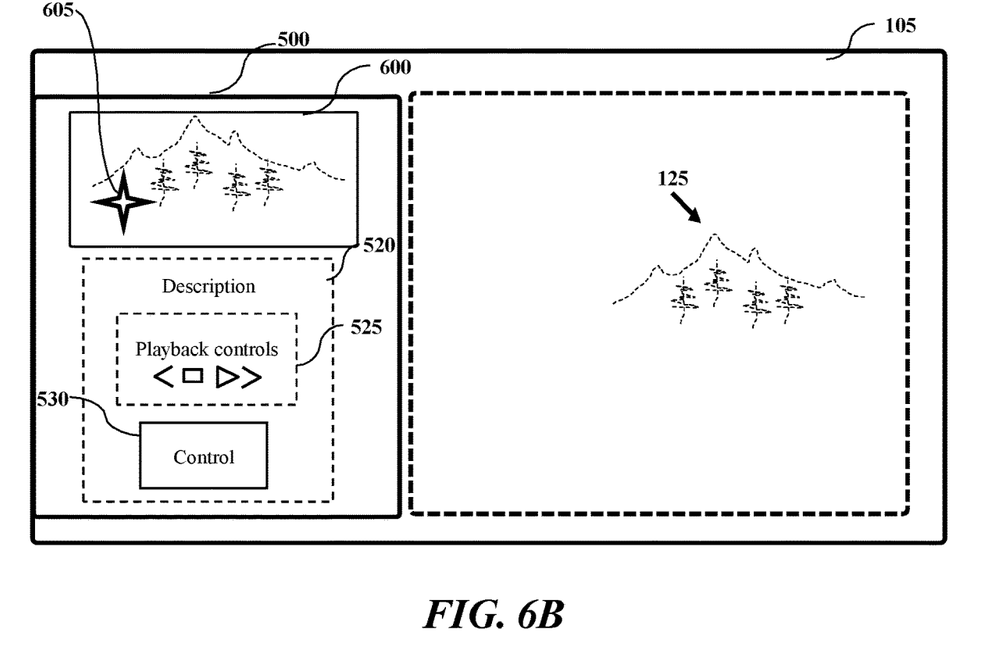
Figure 6C:
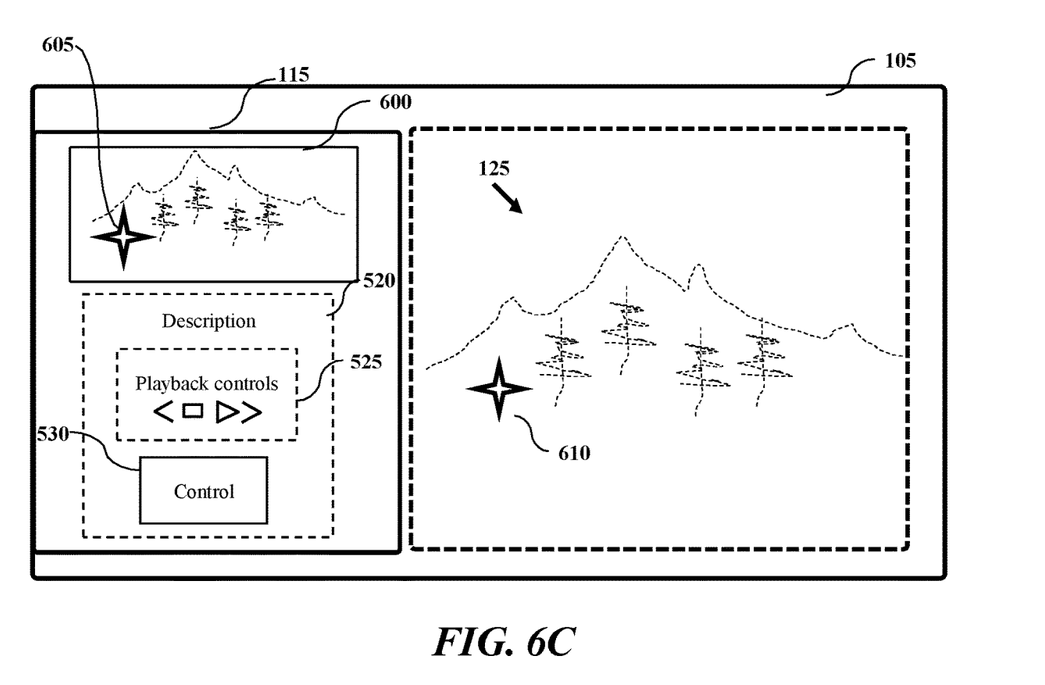

FIGS. 6A-6C illustrate graphical representations of game guide assistance according to one or more embodiments. FIG. 6A illustrates an exemplary representation of display 105 including game guide element 500. Game guide element 500 can be displayed to include a content 600 which may be video content. According to embodiments, content 600 may be presented on the same screen, display 105 as game content such as graphical elements 125. Content 600 may be an assistance video for a game state associated with graphical elements 125. Content 600 may be video content. Content 600 may be controlled by controls 520 of game guide element 500. FIG. 6B illustrates advanced of content 600 to show the location of a hidden object, such as trophy 605. A user may pause the video, or let the video complete and a gaming device may allow for content 605 to be displayed while the user controls gameplay including graphical elements 125. FIG. 6C illustrates the gameplay window to be updated based on user controls and display of trophy 610 in the game for a user to collect.

Figure 7A:
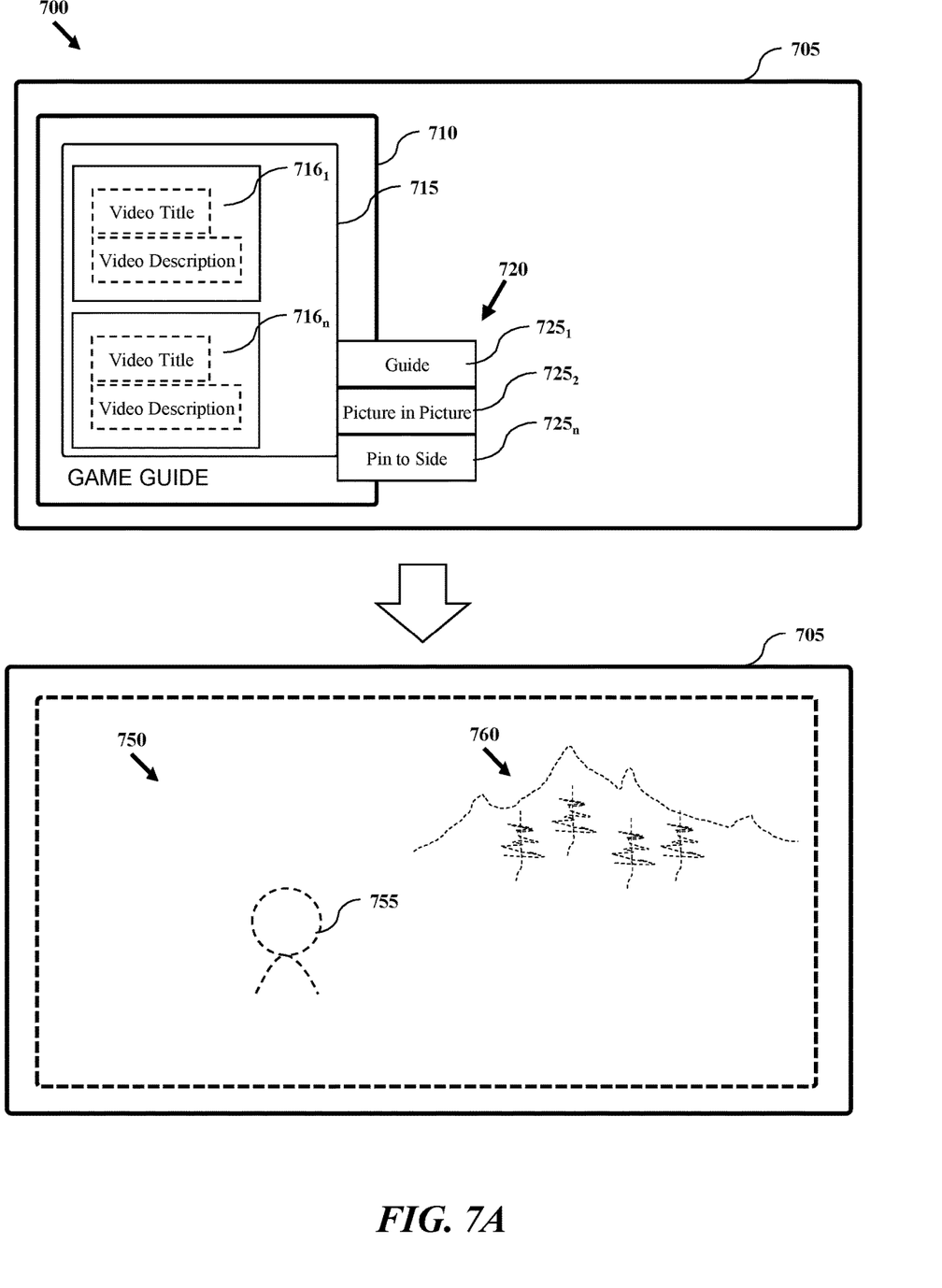
FIGS. 7A-7B illustrates a graphical representation of game guide launch according to one or more embodiments.
Figure 7B:
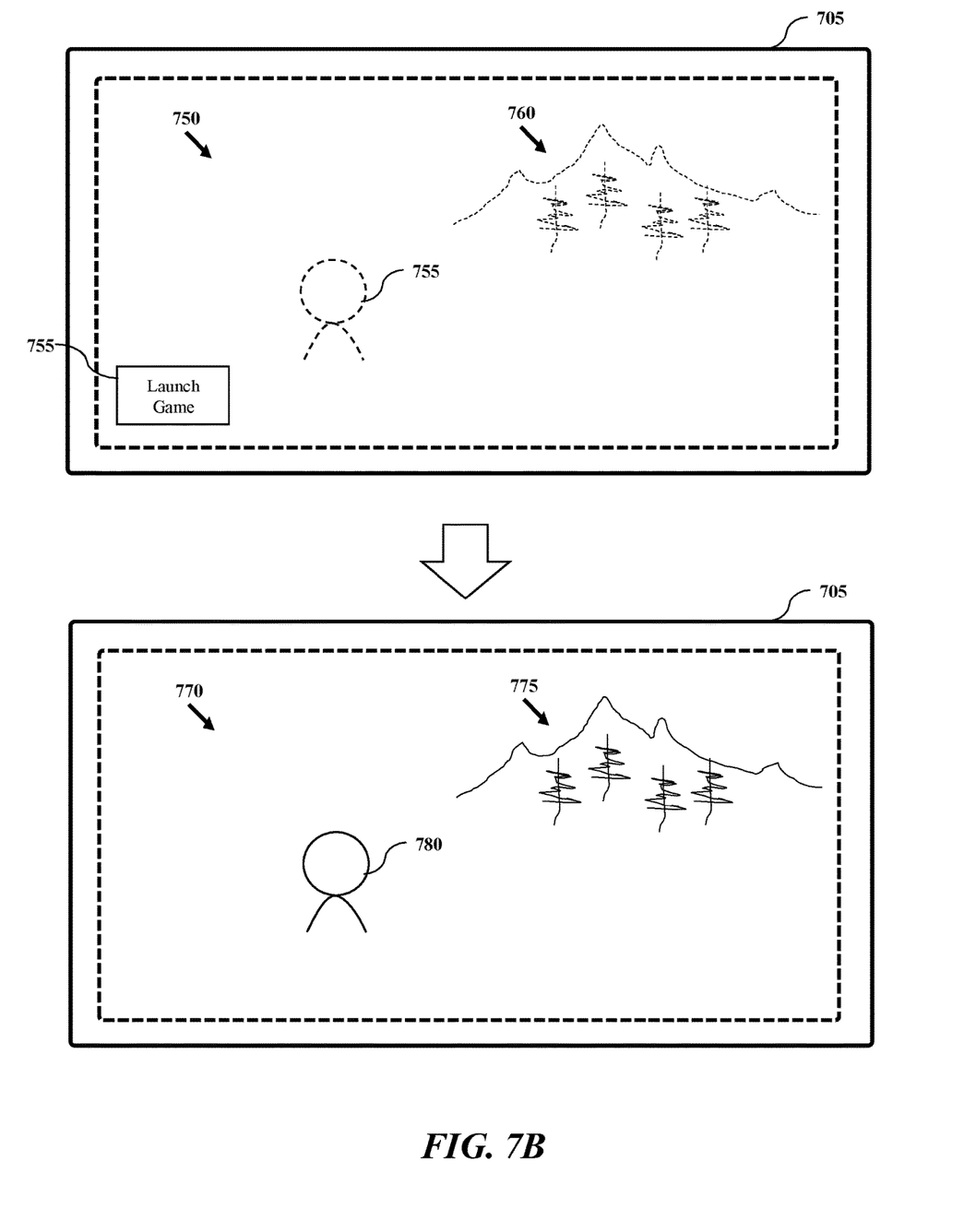

FIGS. 7A-7B illustrate graphical representations of game guide launch according to one or more embodiments. FIG. 7A illustrates an exemplary representation of a process 700 for launching a game guide element. Display 705 may include game guide element 710 including content 715. Content 715 can include a plurality of content items 716$_{1-n}$. Game guide element 700 can be displayed to include commands 720 which may include one or more of a commands in display elements 725$_{1-n}$. Display element 725$_1$ may be configured to launch a guide video. Display element 725$_2$ may be configured to present the content as picture-in-picture. Display element 725$_n$ may be configured to present the content as pinned to the side of a display screen. According to detection by a gaming device of selection of the display element 725$_1$, a gaming device may present content of an assistance element of the game guide. FIG. 7A illustrates launching of the assistance video on display 705. A gaming device may play video content on a screen to provide assistance and show a user how to accomplish a game task. According to embodiments, a gaming device may be configured to present controls during presentation of the assistance video.

FIG. 7B illustrates display 705 presenting the assistance video of FIG. 7A with the addition of launch game element 755. Launch game element may be a display element that may be selected by a user to launch the game into the game state of the video. According to embodiments, based on detection of a user input to select launch game element 755, a gaming device may update the display to launch a game to the game state of video. FIG. 7B illustrates presentation of gameplay 770 including graphical elements of game 775 and a controlled able character 770. Presentation of an assistance video in FIG. 7A may allow for playback and control of a play-through video but not control of a game character. Presentation of gameplay 770 may allow for control of a controllable character and actual gameplay.

While this disclosure has been particularly shown and described with references to exemplary embodiments thereof, it will be understood by those skilled in the art that various changes in form and details may be made therein without departing from the scope of the claimed embodiments.

What is claimed is:

1. A method for presenting a game, the method comprising:
   detecting, by a device, a game state and at least one user interface selection for a game guide;
   updating, by the device, display output to include a game guide element, wherein the game guide element includes a search tab for searching and identification of game assistance content, and wherein at least one of a game title, game history, and game state is used to identify game guide content;
   identifying, by the device, game guide content for the game guide element, wherein the game guide content includes at least one walkthrough video based on game state and wherein identifying the game guide content includes generating, by the device, at least one search term based on the game state for identification of content; and
   presenting, by the device, game guide content with the game guide element.

2. The method of claim 1, wherein the at least one interface selection is selection of a game guide action card in a menu display for an electronic game.

3. The method of claim 1, wherein updating the display output includes presentation of the game guide element and presentation of gaming content, wherein each of the game guide element and gaming content are independently controlled.

4. The method of claim 1, wherein updating the display output includes presentation of a listing of game guide assistance videos.

5. The method of claim 1, wherein updating the display output includes display of a plurality of game guide source elements and a search element, wherein the game guide element is presented with a plurality of tab elements, and wherein the tab elements are presented to include a tab for game walkthrough content based on a game state, a tab for user generated content based on a game state, and a tab for user generated content from at least one friend based on a game state.

6. The method of claim 1, wherein the device is configured to monitor game state and generate a search string to include at least one of a game title, game state and keyword for identification of video content.

7. The method of claim 1, wherein presenting game guide content includes presentation of a game guide assistance video with display controls and controlling presentation of a game.

8. The method of claim 1, wherein the device identifies game guide content based on trophy tracking for a game.

9. The method of claim 1, further comprising detecting a user selection of the game guide element and controlling a game state of a game in response to the user selection.

10. The method of claim 1, further comprising detecting the game state, wherein game guide content for the game guide element is identified based on the game state.

11. A device configured for presenting a game, the device comprising:
   an interface;
   a memory storing executable instructions;
   and a controller coupled to the interface and the memory, wherein the controller is configured to detect a game state and at least one user interface selection for a game guide;
   update display output to include a game guide element, wherein the game guide element includes a search tab for searching and identification of game assistance content, and wherein at least one of a game title, game history, and game state is used to identify game guide content;
   identify game guide content for the game guide element, wherein the game guide content includes at least one walkthrough video based on game state and wherein identifying the game guide content includes generating, by the device, at least one search term based on the game state for identification of content; and
   present game guide content with the game guide element.

12. The device of claim 11, wherein the at least one interface selection is selection of a game guide action card in a menu display for an electronic game.

13. The device of claim 11, wherein updating the display output includes presentation of the game guide element and presentation of gaming content, wherein each of the game guide element and gaming content are independently controlled.

14. The device of claim 11, wherein updating the display output includes presentation of a listing of game guide assistance videos.

15. The device of claim 11, wherein updating the display output includes display of a plurality of game guide source elements and a search element, wherein the game guide element is presented with a plurality of tab elements, and wherein the tab elements are presented to include a tab for game walkthrough content based on a game state, a tab for user generated content based on a game state, and a tab for user generated content from at least one friend based on a game state.

16. The device of claim 11, wherein the device is configured to monitor game state and generate a search string to include at least one of a game title, game state and keyword for identification of video content.

17. The device of claim 11, wherein presenting game guide content includes presentation of a game guide assistance video with display controls and controlling presentation of a game.

18. The device of claim 11, wherein the device identifies game guide content based on trophy tracking for a game.

19. The device of claim 11, further comprising detecting a user selection of the game guide element and controlling a game state of a game in response to the user selection.

20. The device of claim 11, further comprising detecting the game state wherein game guide content for the game guide element is identified based on the game state.

\* \* \* \* \*